US 6,314,089 B1

(12) United States Patent
Szlam et al.

(10) Patent No.: US 6,314,089 B1
(45) Date of Patent: Nov. 6, 2001

(54) CREATING AND USING AN ADAPTABLE MULTIPLE-CONTACT TRANSACTION OBJECT

(75) Inventors: Aleksander Szlam, Norcross; James E. Owen, Smyrna, both of GA (US)

(73) Assignee: Inventions, Inc., Norcross, GA (US)

( * ) Notice: Subject to any disclaimer, the term of this patent is extended or adjusted under 35 U.S.C. 154(b) by 0 days.

(21) Appl. No.: 08/840,906

(22) Filed: Apr. 17, 1997

Related U.S. Application Data
(60) Provisional application No. 60/016,782, filed on May 7, 1996.

(51) Int. Cl.[7] .................................................. H04L 12/16
(52) U.S. Cl. ............................ 370/270; 370/352; 379/201; 709/238
(58) Field of Search ............................... 370/254, 255, 370/256, 270, 351, 389, 400, 401, 364, 352; 379/265, 220, 266, 90.1, 142, 88.25, 201, 88.22, 210; 395/200.31, 702; 709/204, 238

(56) References Cited

U.S. PATENT DOCUMENTS

| | | | |
|---|---|---|---|
| 4,988,209 | * | 1/1991 | Davidson et al. .................... 370/270 |
| 5,185,782 | * | 2/1993 | Srinivasan ........................ 379/88.25 |
| 5,404,525 | * | 4/1995 | Endicott et al. ..................... 395/702 |
| 5,436,967 | * | 7/1995 | Hanson .............................. 379/266 |
| 5,592,543 | * | 1/1997 | Smith et al. ........................ 379/265 |
| 5,594,791 | | 1/1997 | Szlam et al. . |
| 5,621,789 | * | 4/1997 | McCalmont et al. ............... 379/265 |
| 5,633,924 | * | 5/1997 | Kaish et al. ........................ 379/266 |
| 5,675,637 | * | 10/1997 | Szlam et al. ........................ 379/142 |
| 5,740,240 | * | 4/1998 | Jolissaint ............................ 379/265 |
| 5,757,904 | * | 5/1998 | Anderson ............................ 379/265 |
| 5,768,360 | * | 6/1998 | Reynolds et al. .................... 379/220 |
| 5,790,650 | * | 8/1998 | Dunn et al. ........................ 379/265 |
| 5,862,325 | * | 1/1999 | Reed et al. ..................... 395/200.31 |

FOREIGN PATENT DOCUMENTS

| | | |
|---|---|---|
| 20137/97 | 12/1999 | (AU) . |
| 0425161 | 5/1991 | (EP) . |
| 0426361 | 5/1991 | (EP) . |

(List continued on next page.)

*Primary Examiner*—Hassan Kizou
*Assistant Examiner*—John Pezzlo
(74) *Attorney, Agent, or Firm*—Troutman Sanders LLP; Charles L. Warner

(57) ABSTRACT

An object is dynamically created which contains all of the information relating to connections established during a transaction. This object also contains information and/or pointers to information which was used in a communication during the transaction. The object further contains tests for triggering events. When a triggering event occurs the connections are automatically re-established so that a further communication relating to a transaction may be accomplished with excellent efficiency and without any duplication of effort by an agent (including an electronic agent or device) to locate information which was located during the previous communication. The test is administered by a business process mediator, which invokes a business task mediator, which may invoke multiple lesser task mediators, each of which may invoke additional lesser task mediators. Task mediators perform functions ranging from a lower level function, such as detecting a dial tone, to a higher level function, such as connecting a customer to an agent and providing all relevant customer information to the agent. The calling of a higher level task mediator automatically invokes the calling of the lesser, lower level task mediators necessary to accomplish the specified task. Thus, the various task mediators automatically reconstruct the connections necessary to accomplish the further communications. The communications may be by telephone, conventional mail, facsimile, electronic mail, internet, wireless, satellite, cable TV, radio, or other means and may involve audio, video, text, facsimile or electronic mail documents, pictures, spreadsheets, etc.

17 Claims, 7 Drawing Sheets

FOREIGN PATENT DOCUMENTS

| | | |
|---|---|---|
| 0470415 | 2/1992 | (EP) . |
| 0604041 | 6/1994 | (EP) . |
| 0633685 | 1/1995 | (EP) . |
| 97302951.5 | 11/1999 | (EP) . |
| 2290193 | 12/1995 | (GB) . |

* cited by examiner

CREATING AND USING AN ADAPTABLE MULTIPLE-CONTACT TRANSACTION OBJECT

CROSS REFERENCE TO RELATED APPLICATION

This application claims the priority of U.S. Provisional Patent Application No. 60/016,782, filed May 7, 1996.

TECHNICAL FIELD

This invention relates to service centers and communication centers and, more particularly, describes a method for consolidating various types of information arising from various initial steps or contacts of a transaction into a single, composite transaction record for use in various subsequent steps or contacts of the transaction until the transaction has been completed.

BACKGROUND OF THE INVENTION

Typically, in service center or call center environments, such as sales, collections, customer service, etc., the different media involved in the transaction are completely independent. Consider, for example, just the different media of voice and data. If an incoming call from a customer is answered by a first agent, and that first agent discusses an item with a customer, and accesses a database to obtain information to service the customer, and then determines that the call should be handled by the second agent, then the first agent transfers the call to the second agent. However, only the voice portion of the call is typically transferred. Any data located and examined by the first agent, or received by the first agent, or input by the first agent, is not completely transferred to the second agent. The second agent must go through the process of locating and accessing various databases and applications to obtain the information necessary to service the calling party, even though those databases and/or applications were already located and accessed by the first agent. Even worse, preliminary information collected by the first agent, but not entered into a database, is temporary (transitory data) and may be destroyed when the first agent is disconnected from the customer, rather than being transferred to the second agent. Thus, agent effort is duplicated, agent time is wasted, agent efficiency is reduced, and service to the customer is delayed while the second agent obtains the same information previously obtained by the first agent. Further, the customer may become frustrated if the customer has to repeat the request or state the problem to the second agent, and again to a third agent if transferred again, etc.

One approach to this problem is, once the first agent obtains information, such as by downloading from a database, that information is transferred to the terminal of the second agent when the voice call is transferred from the first agent to the second agent. The amount of information obtained from the database may be quite large and require several seconds to transfer, thus wasting time and system resources, such as by occupying the network for the duration of a file transfer from a database. Also, the agent terminals may not be identical and the terminal of the second agent may not be able to accept all of the information from the terminal of the first agent. In addition, the needed information may be in the first database previously accessed and then closed by the first agent, but not in the second database accessed by the first agent, in which case the file or information transferred from the second database would be unnecessary and a waste of system resources.

Many transactions require more than one step or contact. For example, consider the following scenario relating to the processing of a claim or report arising from an automobile accident. The customer (a calling party) calls the general telephone number for the business (an insurance company). A first agent (a receptionist) or an interactive voice response (IVR) unit answers the call to determine how the call should be routed (new claims, status of existing claims, general information, new insurance applications, employment information, etc.). The customer advises that the customer wishes to report an accident and place a claim. The customer is then transferred to a second agent (a claims reporter). The claims reporter obtains the information from the customer as to the accident and the damage. The claims reporter then assigns a third agent (a claims adjuster) to appraise the automobiles involved, inspect the damage, and assign a value to the claim. The claims adjuster then enters a report regarding the accident, the damage, and the value. The claims adjuster, or possibly another (fourth) agent, then calls the customer or sends correspondence to the customer to report the results of the inspection. If the customer disagrees, then the case may be sent to a higher level (fifth) agent for review and further evaluation or discussion with the customer. A letter may then be sent to the customer regarding the evaluation of the claim. The insurance company may or may not have an automatic follow-up call or letter by another (sixth) agent if the customer does not respond in a predetermined time. Finally, when agreement is reached with the customer, another (seventh) agent in disbursements may issue a check to the customer, thus finally concluding the case.

Note that this single transaction, processing a claim, has numerous steps and involves numerous agents. Further, at any point, the information available to any agent may be incomplete or inadequate if, for example, the physical file is in the office of another agent. Even if there are sufficient databases to contain all of the needed information, the agent attempting to perform a task may have to expend substantial time and effort to locate and search the various databases to find the necessary information. Thus, even when the customer is talking with an agent who was previously working on the case, there may be a delay while the agent searches for the right database containing the needed information.

The dilemma faced by any business using diverse information sources and infrastructures, such as offices in multiple locations as New York, Los Angeles, Denver and Atlanta, is the near autonomy of the information pertaining to the various discrete transactions that make up a business process or function. Autonomy is used in the sense that the transactions are frequently serviced using different independent applications (computer programs), such as an inventory system application, a help desk application, a contract management application, an accounts receivable program, a sales order entry, etc. Even transactions which use the same application frequently exist independently as stored documents on file servers, or as records in various department-specific databases. Further, the databases and file servers may be in different locations.

Client/server architecture provides for using applications on desktop personal computers (PC) to combine process or transaction related information. However, the correlation of related information fragments is typically based on single transaction processing. In other words, the correlation between information elements is very application specific. The relationship between the information elements has to be reconstructed for every instance of a transaction, even when a transaction is simply being transferred from one application to another application within the same system as part of a business process. Maintaining continuity between independent systems is even more problematic.

One problem with the prior art is that the prior art treats each event, such as a call, a contact, a mailing or a step, as an independent event, even when an event is merely one of a plurality of events necessary to complete a transaction, such as completing a task or producing a desired result.

Another problem with the prior art is that, when a call is transferred from a first agent to a second agent, a typical prior art system requires the second agent to duplicate the effort of the first agent by locating most of the information that the first agent had previously located.

In another version of the prior art, the problem is that the prior art transfers complete database records, which may contain excessive amounts of data, especially for the process involved.

Further, the prior art does not provide for the preservation or the automatic reconstruction of the connections and associated resources necessary to further a contact. That is, the record of any such connections and associated resources used during a communication is destroyed once the communication has been completed. Thus, the time and agent effort necessary to identify and re-establish such connections is wasted.

In addition, the prior art does not provide for automatically identifying the resources necessary to conduct and support a communication and reserving those resources for a future communication.

SUMMARY OF THE INVENTION

At the heart of any business today is the collection and dissemination of information. The growth and application of information technology continue to evolve at a phenomenal rate. The result is increasingly larger volumes of data which can traverse the globe at the speed of light. These technological advances must be integrated and applied toward increasing the productivity of individual employees, as well as enhancing the collective productivity of an entire business or enterprise. Composite Call Objects provide a new method which melds single, application-centric business transactions into uniform business processes that business managers can monitor and track, even in cases where the resources are widely distributed.

An information element is an item of data which represents transaction history, workflow states, or other types of information. A Composite Call Object is a software "container" which can be loaded with different types of information elements, or loaded with a description of information elements and references to the location of each of the information elements. A token representing this container, the Composite Call Object, can be transferred from one location to another as part of a series of related business transaction, somewhat similar to the transfer of a voice telephone call. As transactions are created and accumulate to accomplish the desired business process or function, the Composite Call Object collects relevant data, the information elements, so that a subsequent user has ready access to all of the information related to the business process or function being performed. The business transaction may involve several different processes and the Composite Call Object collects and preserves the information regarding each process so that the necessary information and resources can be readily identified and accessed for further action on that business transaction. Interactions, connections, and states of the Composite Call Object are recorded as subsequent transactions occur. The Composite Call Object exists until the desired business process or function has been completed, that is, has reached a satisfactory or specified objective.

The Composite Call Object is therefore a retained collection of information elements or pointers to information elements regarding various forms and media types that have been joined together through a common business process or function. The Composite Call Object therefore allows these information elements to be managed, collectively, at a network level in order to efficiently achieve a desired business process or function.

The present invention solves the problems of the prior art by consolidating the information concerning the various resources, contacts and steps in a transaction into a single transaction record and maintaining and updating the record, including linking information to the necessary resources, until the transaction has been completed. This transaction record comprises a plurality of segments and linking information, preferably one for each contact or step in the transaction. This consolidated transaction record is sometimes referred to herein as a Composite Call Object. "Composite Call" is a trademark of Melita International Corporation, Norcross, Ga.

For example, in the above insurance claim example, the first segment in the transaction record is created when the customer calls the insurance company. This first segment preferably contains the date and time of the call, the telephone number of the insurance company that the customer called (if dialed number information service (DNIS) is available and in the event that the company has more than one telephone number), and the telephone number of the customer (calling party) if automatic number identification (ANI) is available. This segment may contain the station number of the receptionist that first handled the call, or the agent that first handled the call if the call was automatically routed to an agent by, for example, routing based upon the number called or upon information entered by a telephone keypad if an IVR is used. Also, if the ANI information caused a "screen pop" to occur, or if the receptionist located and obtained any information on the customer from a database, then the linking information to the database, and optionally the actual information, will be stored in this first segment. Also, if the customer entered any information by using the telephone keypad or by voice, such as an account number, then this information will also be stored in this segment. Finally, this segment will contain the station number of an agent to whom this call is transferred.

This process is repeated so that a new call segment is added each time that a call is transferred, initiated, received, or new information or resources are accessed. Finally, when the transaction has been concluded, the transaction record may be automatically cleared by some predetermined event, such as by the issuance of the settlement check, or manually by an agent having the appropriate level of authorization.

The transaction record thus contains the addresses of the resources (such as agents and trunk lines), contains the addresses of the information and databases containing the information, and also contains transitory data, that is, information which may have been entered by the agent or customer and stored in the agent's workstation, a PBX or ACD database, or other location. Therefore, the efforts of each agent in locating and identifying information regarding the customer are preserved for use by the other agents, thus saving time, increasing agent efficiency, providing for training and auditing, and increasing customer satisfaction. Preferably, the actual information in the database is not stored in the Composite Call Object but linkage information, such as the addresses of such databases, are stored and transferred, so the memory requirements placed on the agent workstations are minimal.

Also, because the transaction record contains the identities (addresses) of the agents involved, the history of the transaction is preserved so that, if necessary, a current agent can determine which of the agents previously handled this customer so that the current agent can verify what information was provided by or to the customer, what promises were made, etc.

It will be appreciated that, even when linkage information and/or addresses are known, several seconds, or even more in some cases, may be required to access the desired information because of limitations on network bandwidth and database response time. This can cause a delay in handling the transaction. Therefore, in the preferred embodiment, some basic information is stored as part of the transaction record. In the example given, the basic information might be the customer's name, the customer's address, the customer's telephone number, the policy number, the date of the accident, the names, addresses and telephone numbers of any persons involved in the accident, the make and model of the automobiles involved, the status of the claim, and any other necessary or desired information such as an internet or e-mail address or a facsimile telephone number. As such, the Composite Call Object may be customized to adapt to virtually any business transaction.

Therefore, when an agent needs to contact the customer, or the customer calls in to talk with an agent, all of the information, or pointers to the information, are in the transaction record so the complete trace of relevant and previously used information can be quickly and easily reassembled and accessed.

The present invention is thus a new and unique method for identifying, aggregating, routing, storing, tracking, and retrieving related information and resources deployed through multiple contacts or steps of a single transaction or through multiple transactions within a single process. A Composite Call transaction record comprises "objects" that can include and/or point to transitory voice and data connections, sequence of events, and other multi-media components such as documents, voice annotations, video clips, and images.

Composite Call processing in its simplest form can be viewed as being related to ACD/PBX call handling in the sense that Composite Calls can be transferred, forwarded and conferenced. However, in Composite Call processing, the voice connection is only one of potentially many components or segments of the record. Voice connections and data connections may be optional, permanent, or transient components of the Composite Call Object.

Composite Calls are closely coupled with transactions and can persist over long periods of time, as long a time as is necessary to successfully complete the transaction. The actual voice and data connection components of a Composite Call Object are usually temporal. These connections are created, destroyed, and reconstructed if necessary as part of a process. A Composite Call Object tracks and reports connection states within a business process and initiates events such as scheduled call-backs through a task mediator. Any component of the Composite Call Object may be extracted and new components may be inserted as necessary during the life of the Composite Call Object. Reference to some or all of the components related to a call object can, of course, be stored as individual objects when those components persist over time.

The present invention also provides a plurality of task mediators. Each task mediator accomplishes a particular function. The particular function may be a higher level function, such as connect an agent to a customer, or may be a lower level function, such as determining whether a particular agent has logged on.

A task mediator for a higher level function automatically calls the lesser, lower level task mediators necessary to achieve that higher level function. For example, a task mediator, in order to connect an agent to a customer, automatically calls the lesser task mediators to reserve the desired agent, to call the customer, and to establish a voice connection between the agent and the customer and a data connection between the agent and the host containing information on the customer. The lesser task mediator to reserve the desired agent automatically calls even lesser task mediators to determine if the desired agent has logged on, whether the desired agent is busy on another task, and to request the desired agent be allocated or queued to the specified communication when the agent is available.

The present invention provides for automatically accessing resources necessary to conduct a further communication.

The present invention provides for storing the information pertaining to the previous communication so that the connections necessary for a further communication can be automatically identified and established.

The present invention provides a method for establishing a second communication between a first point and a second point after a first communication has been established between the first point and the second point. A "point" may be a human, for example an agent or a customer, or may be a device or a program, such as PBX, ACD, voicemail/IVR system, database, applications software, etc. This method includes the steps of creating a Composite Call Object for the first communication, terminating the communication between the first point and the second point, and establishing the second communication between the first point and the second point using information contained in the Composite Call Object. Also, the present invention provides a method for establishing a second communication between a first point and a third point after a first communication has been established between the first point and the second point. This method includes the steps of creating a Composite Call Object for the first communication, terminating the communication between the first point and the second point, and establishing the new, second communication between the first point and the third point using information contained in the Composite Call Object, where the second point and the third point are different.

In this method, the step of creating the Composite Call Object includes determining an identity for the first point, determining an identity for the second point, determining an identity for a connection broker between the first point and the second point, and recording, as the information, the identity for the first point, the identity for the second point, and the identity for the connection broker.

The step of creating the Composite Call Object may further include identifying data accessed by the first point, and recording, as the information, an address for the data.

The step of creating the Composite Call Object may further include identifying an information source providing data accessed by the first point, and recording, as the information, an identity for the information source.

The step of creating the Composite Call Object may further include identifying an information source providing data accessed by the first point, identifying a data connection broker between the first point and the information source, recording, as the information, an identity for the information source, and recording, as the information, an identity for the data connection broker.

The step of creating the Composite Call Object may further include identifying data accessed by the first point, and identifying an information source providing the data, identifying a data connection broker between the first point and the information source, recording, as the information, an address for the data, recording, as the information, an identity for the information source, and recording, as the information, an identity for the data connection broker.

In this method, the step of establishing the second communication includes reading the information to identify the first point, reading the information to identify the second point, reading the information to identify the connection broker, and causing the connection broker to establish a communications path between the first point and the second point.

The step of establishing the second communication may further include reading the information to identify an information source which provided data accessed by the first point, reading the information to identify a data connection broker which provided a connection between the first point and the information source, and causing the data connection broker to establish a data communications path between the first point and the information source.

The present invention also provides a method of implementing a predetermined process. This method includes the steps of monitoring for a triggering event and, in response to an occurrence of the triggering event, identifying a resource necessary to accomplish the predetermined process and determining whether the resource is available. If the resource is available then the predetermined process is executed. If the resource is not available then a new triggering event for the predetermined process is created.

The present invention also provides a method of implementing a predetermined process. This method includes the steps of monitoring for a triggering event and, in response to an occurrence of the triggering event, activating a first task mediator, the first task mediator calling a plurality of lesser task mediators, and activating each of the lesser task mediators performing a predetermined function and reporting the results of the predetermined function to the first task mediator.

In this method, the step of calling comprises sending instructions to the lesser task mediators and receiving information from the lesser task mediators.

The present invention also provides a system for performing a predetermined process. This system includes a superior task mediator responsive to an occurrence of a triggering event for calling lesser task mediators to accomplish an overall function, the overall function comprising a first function and a second function, a first lesser task mediator, the first lesser task mediator comprising means for executing a first function and reporting the results of the first function to the superior task mediator, and a second lesser task mediator, the second lesser task mediator comprising means for executing a second function and reporting the results of the second function to the superior task mediator.

The present invention also provides a system for establishing a plurality of communications. This system includes a first plurality of agent stations for allowing a plurality of agents to conduct oral communications with a plurality of persons and to see information and to input information, a plurality of hosts, each host of the plurality of hosts containing a plurality of account records, a plurality of communications brokers, each of the communications brokers being for establishing communications links among the agent stations and the hosts, and at least one of said agent stations or said hosts comprising a memory for storing a plurality of Composite Call Objects. In this invention each agent station has an address; each host has an address, each account record has an address; and each of the communications brokers has an address. Each Composite Call Object includes an address of each participating agent station, an address of a host, addresses of databases used, an address of an account record, and an address of a communications broker which links the agent station to the host(s) or application(s).

Further, communications are not limited to oral communications and agents. The present invention provides for communication in any form, such as conventional mail, electronic mail, internet communications, video, machine-to-machine data/information transfers, etc. In this environment each device has an address, such as a server address, or a facsimile server address, or a printer address, etc. Therefore, each device and/or each group of similar devices may be specifically identified and utilized as necessary to accomplish the intended transaction.

The present invention also provides pointers to other resources used during transactions, such as fax services, text-to-speech services, voice recognition/translation services, etc.

Other objects, features, and advantages of the present invention will become apparent upon reading the following description of the preferred embodiment, when taken in conjunction with the drawings and the claims.

DETAILED DESCRIPTION OF THE INVENTION

Figure 1:
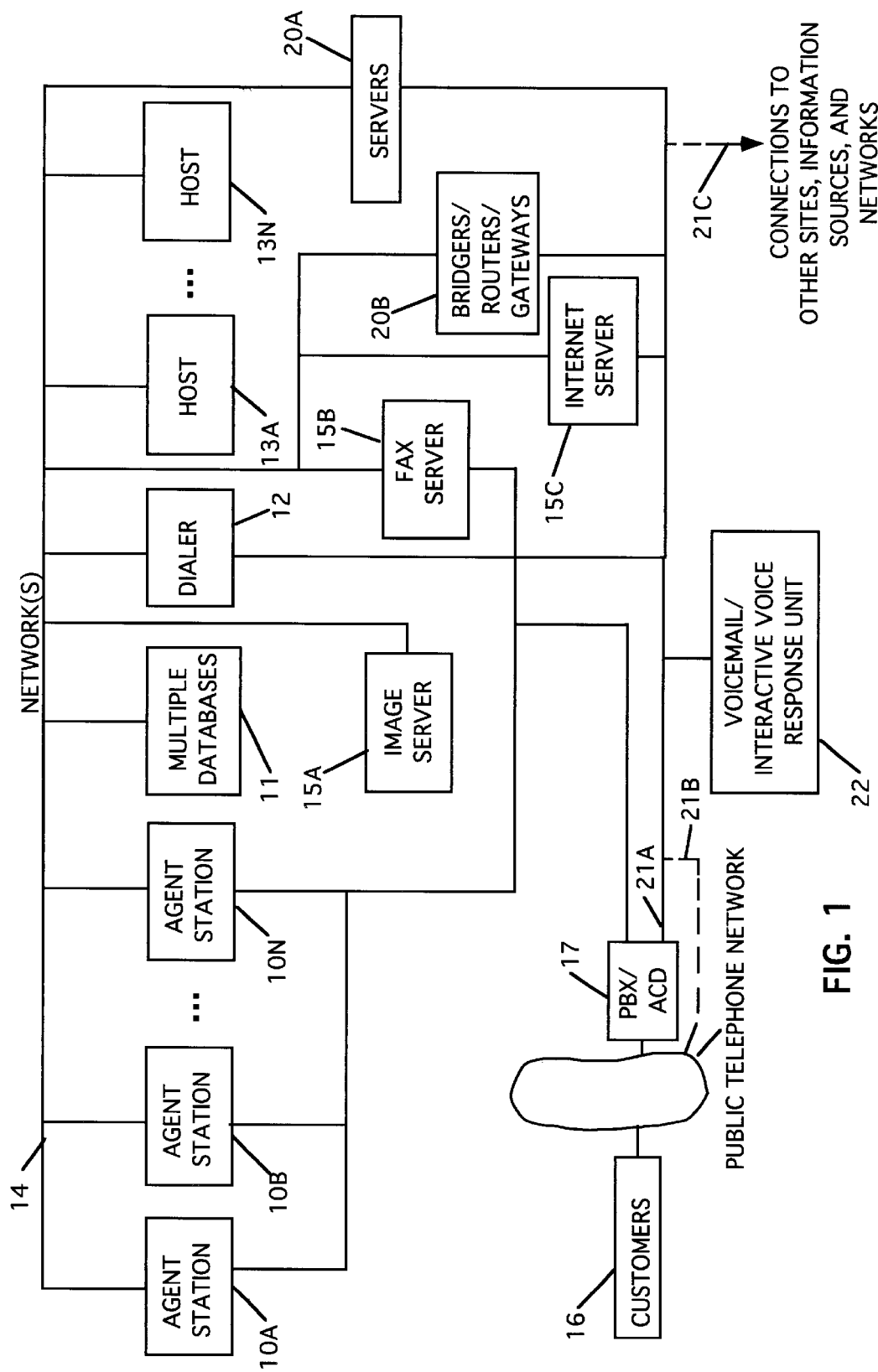
FIG. 1 is an illustration of an exemplary environment of the present invention.

Turn now to the drawing in which like numerals reference like components throughout the several figures. FIG. 1 is an illustration of an exemplary environment of the present invention. Many different environments are contemplated by the present invention, depending on the type of business involved. Therefore, the environment for use of the present invention in an insurance company may be different than the environment for use in a collection organization, or a marketing organization, or a credit granting organization, or a banking organization. An example of the implementation of the present invention with respect to a company (ABC Corporation) that sells consumer electronic devices is described later herein. Therefore, the sources in which the information are stored and the methods by which the sources are accessed may vary greatly from business to business and from environment to environment.

A plurality of agent stations 10A–10N are connected via a network 14, to each other and also to a database servers 11, which preferably contains multiple databases, a dialer 12, such as an enterprise-wide dialer, and one or more hosts 13A–13N. Network 14 may be, or may be connected to, a local area network (LAN), a wide area network (WAN), a dial-up network, or another type of network. Other components (not shown) may also be involved, such as an image scanner or a printer. In this example, these components are connected so as to form a service center which handles both inbound and outbound calls and other business transactions. An example of such a service center (call center) is shown in the following U.S. Pat. Nos. 4,797,911; 4,894,857; and 5,214,688. Although not necessary for implementation of the present invention, the preferred embodiment of the present invention also incorporates the teachings of U.S. patent application Ser. No. 08/318,506, filed Oct. 5, 1994, entitled "Method and Apparatus for Providing Result-Oriented Customer Service", U.S. Pat. No. 5,594,791, issued Jan. 14, 1997, and U.S. patent application Ser. No. 08/441,830, filed May 16, 1995, entitled "Method for Consolidation of Multiple Data Sources", published Nov. 20, 1996 as European Patent Office publication number 0743781.

It will be appreciated that some components may be necessary for one organization, but not be needed for another organization. For example, organizations that only process inbound calls may not require a dialer. Some organizations may require the support of specialized servers 15, such as an image server 15A, a facsimile server 15B, or an internet server 15C. A database, as the term is used herein, may be any device or group of devices which contains information. Examples of devices include, but are not limited to computers, personal computers, workstations, PBXs, ACDs, voicemail systems, interactive voice response (IVR) systems, etc. Examples of information are text, graphs, pictures, e-mail, video, audio, internet objects, internet web sites, etc. The dialer 12, if needed to implement the services of an organization, is preferably a PhoneFrame® dialer, manufactured by Melita International Corporation, Norcross, Ga., USA. PhoneFrame® is a registered trademark of Melita International Corporation. The hosts 13A–13N may be any host which has an application or information which is useful or necessary to the proper handling or disposition of the call. The agent stations 10A–10N are also connected by a network 14 to another network, to a bridge/router/gateway 20B, or a modem to other information sources, which may be in different locations, even in different countries. The network 14 may be a local area network (LAN) or a wide area network (WAN). The agent stations 10A–10N, the fax server 15B, and the dialer 12 may also be connected to a PBX/ACD 17. The PBX/ACD 17 is connected to telephone service, such as the public switched telephone system. A customer 16 may call or be called via the telephone service. An agent station 10 preferably comprises: a headset or other audio communications means for allowing the agent to hear audible types of information (words, music, etc.) and to communicate with another party, such as a customer or another agent; a keyboard and mouse for allowing the agent to enter information; a monitor or other display for allowing the agent to view information; and a computer, such as a '486-based personal computer. The general design and construction of agent stations are well known in the art. Communications paths for the various devices may be, for example, path 21A through the PBX/ACD 17, path 21B directly to the public telephone network, or path 21C to other sites, information sources, and networks, by any convenient means including, for example, public or private telephone carriers and internet paths.

Consider the case of an agent at a first workstation 10A needing to talk to another agent at another workstation 10B. Many telephone systems, such as PBX 17, provide an audible or a visual directory. A person may use the telephone keypad to key in some letters from the name of another agent, may thereby obtain the extension number of that agent, and may then be connected to that agent. Also, many businesses have a personnel directory available on a host 13, such as host 13A, or on a voicemail/IVR unit 22, by which an agent can use the keyboard at a workstation or a telephone keypad to enter the name of another agent and obtain directory information on that other agent, such as a station or extension number and a department, or enter the name of a department and obtain a listing of agents of that department. Once the first agent has obtained the station number of the second agent, the first agent can then use the telephone keypad to dial the number of the second agent and be connected with the second agent via the PBX 17. In many telephone systems, when the first agent places the call the second agent is provided with a telephone display which indicates the name and the station number of the calling party, in this case the first agent.

However, as seen from the above, the complete information may exist in two, three, or even more independent systems, for example, PBX 17, host 13A, and voicemail/IVR system 22. The information in one system, for example host 13A, is not useful in the other system, for example PBX 17. Thus, after the first agent looks up in the station number of the second agent in the directory in the host 13A, the first agent must then manually dial the station number of the second agent. Further, the information is transitory and does not persist when the call is completed. Thus, if there is a need for a follow-up contact, such as another call, the first agent must look up or remember the station of the second agent, or vice versa. In contrast, the present invention creates a composite record of the call when the call is set up. When the first agent dials, or causes to be dialed, the station number of the second agent, certain information about the first agent and the second agent are recorded. For example, the name, station number, and department of the first agent and of the second agent are recorded. Then, while the call is in progress, either the first agent or the second agent can, by keying in a code using the telephone keypad, or by entering the proper command on the workstation keyboard, indicate that a follow-up call is necessary. Commands may also be entered by any other convenient means, such as a mouse, light-pen/pointer, touch-sensitive screen, etc. The controlling host, such as host 13A, then provides a prompt as to the date and/or time of the follow-up call and a prompt whether the follow-up is to be automatically initiated or merely prompted. Either agent may provide the information. The host 13A will then, along with the information mentioned above, record a note that a follow-up call is needed. Then, when the time for the follow-up call arrives, the host 13A will automatically initiate the call or prompt the specified agent to make the follow-up call, as previously specified.

Regardless of whether automatic calling is specified or prompting is specified, the host 13A will provide the information concerning the previous call to the monitor of the specified agent or agents. Thus, when the agents are connected by the follow-up call, each agent has a display of the information concerning the previous call. In addition to the information about the agents mentioned above, the composite record may also contain information regarding the subject of the call, such as the billing and payment record of a particular customer.

This process is not limited to just the two agents involved. For example, the host 13A may also prompt the agents to specify whether another agent, such as a supervisor at station 10N, should be involved in the follow-up call, or may specify that the follow-up call may be between only one of the agents and the supervisor. In any case, the information about the supervisor at station 10N also becomes part of the composite record and is presented to the persons connected to the follow-up call. Thus, when the follow-up call is made, the supervisor has complete information regarding the previous call, even though the supervisor was not involved in the previous call, and even if one of the agents involved in the previous call is not involved in the follow-up call.

The composite record is not limited to follow-up calls. For example, assume that, after the first agent calls the second agent, the second agent determines that the second agent cannot help the first agent and conferences in a third agent at station 10N. The composite record will be updated to include the information about the third agent. Thus, the three agents will all have information about each other and also about the customer of interest.

In another example, assume that, after the first agent calls the second agent, the second agent determines that the second agent cannot help the first agent and transfers the call to another agent at station 10N. The composite record will be updated to include the information about the third agent and will retain the information about the second agent unless this information is specifically deleted by one of the other agents. Thus, the first and third agents will have information about all three agents and also about the customer of interest.

Thus, the composite record may be transferred, conferenced, or persist in time for a follow-up action, which may also be transferred, conferenced, or persist in time for another follow-up action, etc. Therefore, at each step, as another agent is added, or information provided or obtained, the composite record is updated to reflect the new information and/or new resources engaged.

In the preferred embodiment, the composite record comprises a plurality of segments, with each new event adding another segment. For example, a composite record will be created and the first segment created when the first agent or task (machine driven or originated) accesses the customer information. An example of a task which may access information is an automated dialing operation. The first segment will contain the information on the identity of the first agent/task and the address of the customer information. When the first agent calls the second agent a second segment will be created and will contain the identity of the second agent and any new information added, accessed or located by the second agent. Likewise, when a third agent is contacted, the third segment will be created and will contain the identity of the third agent and any new information added or located by the third agent. If a follow-up call is necessary then a fourth segment will be created which will contain information regarding the follow-up call.

The information in a segment may be, but need not be, all of the information available in a database, databases, hosts, servers, or applications, regarding a particular person or thing. For example, the identity of the first agent may be the name of the first agent, the station number of the first agent, and the identification number of the first agent. The first segment may contain this information and may also contain one or more pointers which specify the location of this information or other information. The information may be located in one or more databases or devices, hosts, voicemail systems, PBX/ACD systems, agent workstations, etc. The information may be available over a local network, a wide area network, or even over a global network, such as the internet. The information accessed may be text, data, pictures, audio, video, images, or any other information which can be accessed and transmitted by any form of electronic means. The pointer may be short and simple where the source is local and but may be long wherever necessary, such as where the source is remote.

Figure 2:
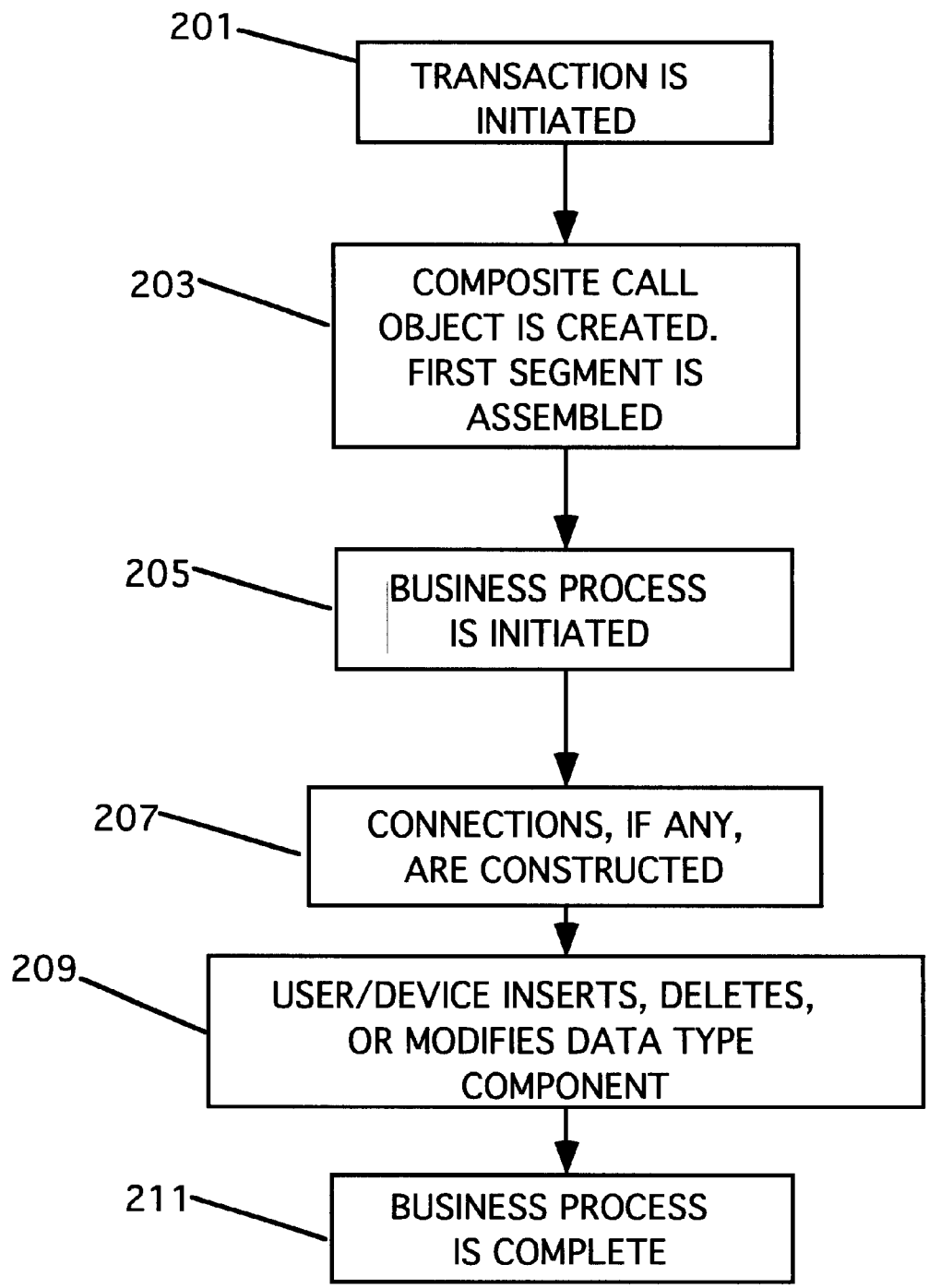
FIG. 2 is an illustration of the creation of a Composite Call Object.
Figure 3:
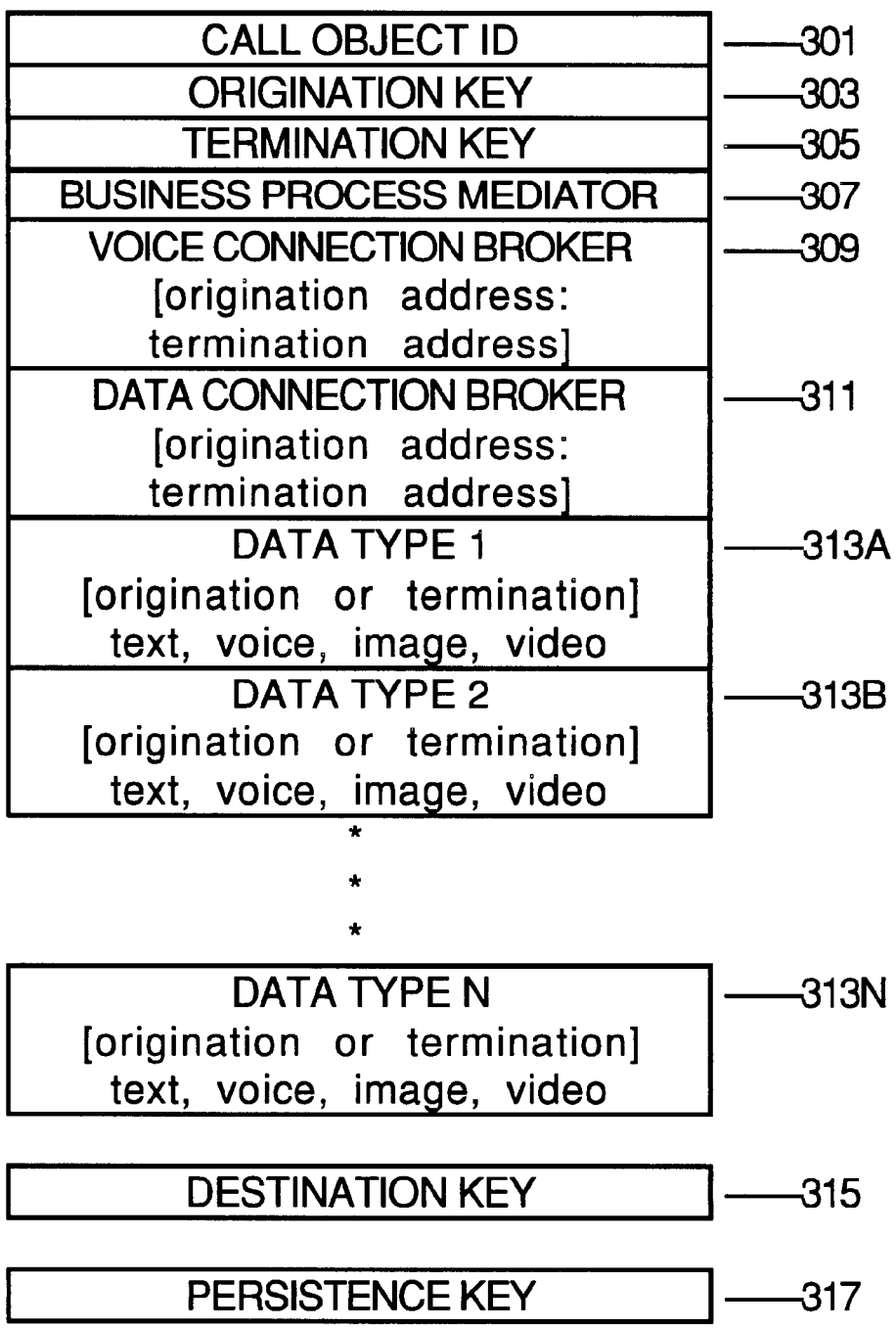
FIG. 3 is an illustration of the components of a Composite Call Object.

Turn now to FIG. 2, which is an illustration of the creation of a Composite Call Object, and FIG. 3, which illustrates the components of a Composite Call Object. In step 201 a transaction, call, communication, or some other action or contact is initiated. This may the placement of an outbound call, or the arrival of an inbound call, or the sending or receipt of a facsimile message or an electronic mail message, or the sending or receipt of a voicemail message, etc.

In step 203 the Composite Call Object is created. The execution of a program by a device to create a Composite Call Object causes the device to alter the memory of the device, or of another device as explained below, to have the configuration shown in FIG. 3. The different elements in FIG. 3 correspond to different memory areas in the device in which the Composite Call Object is stored. As shown at 301 of FIG. 3, the Composite Call Object is assigned a unique identification number. This identification number serves to distinguish this composite call from any other composite call, such as a composite call which may originate from or be residing in another location. The other location may be any location in the world which is connected to the local device via a communications link, such as a network, internet, or telephone service. Also, in step 203, the first segment of the Composite Call Object is assembled, as shown at 303, by creating a unique origination key, which identifies the origination source. For an incoming call the origination key may be, for example, a date/time/location code, a trunk identification number, an ANI number, a workstation identification number, an Interactive Voice Response (IVR) input, or any other unique identification or label which can be used to identify the source of the call. For an outbound call the origination key may be, for example, the date and time, and a location, the outbound trunk identification number, the unique identity of the dialer 12, and a pointer to the information about the customer who is being called. The location code may be a device designation and/or may include geographical information, such as a city, county, state, and country.

In step 205 the business process is initiated. If the call is an incoming call then the call could be transferred somewhere, such as to an agent workstation, so at step 207 any necessary connections (voice and data) are constructed. At 305, a termination key is inserted, which identifies the termination destination, in this case the agent workstation.

As indicated at step 207, some means of connection of the call to the workstation is necessary, such as a voice connection. Therefore, at 309, the voice connection broker is identified, such as a PBX. Also, the source is identified (trunk ID for example) and destination is identified (workstation extension number for example) so that the voice connection broker (the PBX in this case) has the information necessary to complete the voice connection. The data type associated with this connection will also be identified as shown at 313A. In this case, the data type is voice. This information is used in step 207 to update the Composite Call Object. The information stored in a step 313 may be actual data, may be a part of the data, and/or may be linkage information to the actual data.

The receipt of ANI information may cause a database to be automatically annexed so that information associated with that ANI number is automatically displayed to the agent at that workstation. Therefore, another connection, for data, is necessary and is constructed. In this case, a data connection broker would be involved, such as a data router 20B or a network server 20A. For convenience of illustration only one element 20A and one such element 20B is shown. However, it should be appreciated that more than one data router 20B or network server 20A may be used or may even be necessary to implement a desired speed of data access or to access a particular data source. In most cases a data connection broker is involved and so the particular data connection broker 20 would be identified at 311. Also, the source is identified (the database for example) and destination is identified (workstation network address for example) so that the data connection broker 20 (the network server in this case) has the information necessary to complete the data connection. This information is used in step 207 to update the Composite Call Object.

The data type associated with this connection will also be identified as shown at 313B. In this case, the data type is text. This information is used in step 207 to update the Composite Call Object.

Other data types may also be involved, for example, imaging information or video information. In such cases, other data connections would be constructed and the necessary brokers 20B would be identified, the source and destination identifications would be provided, and the data type would be identified. This information is used in step 207 to update the Composite Call Object.

As the business process is conducted the agent may access records or other information in other databases in order to conduct the business process. As each new record or item of information is accessed, the Composite Call Object is updated to include any new connections, the brokers necessary to handle the information, the address (origination address) of the information and the address (termination address) of the agent workstation, and the information type. Therefore, as the business process continues, the Composite Call Object is continually updated to include the information necessary to recreate the business process. In step 209, the user, such as an agent or a device, may add or insert new data or new data types, modify existing data or data types, or delete data or data types, as necessary to properly conduct the business process involved. Devices may be, for example, voicemail systems, PBXs, ACDs, and programs, such as background programs running on an agent workstation (sometimes referred to as an "electronic agent"). This information is used in step 209 to update the Composite Call Object.

As the call or business process continues, the first agent involved may add a second agent, or transfer the call to a second agent. In this case the Composite Call Object is updated to include the information concerning the second agent. For example, the termination key would be updated to include the identification of the second agent, and the termination address of the voice connection broker and the data connection would be updated to include the address of the second agent. If the second agent was located on a different system, such as being at a different physical address, then another voice connection broker element would be added to the Composite Call Object to identify the voice connection broker necessary to connect the voice component to the second agent, and another data connection element would be added to the Composite Call Object to identify the data connection broker necessary to connect the data component to the second agent. Therefore, as the business process continues, the Composite Call Object is continually updated in steps 207 and 209 to include the information necessary to recreate the business process until the last data type 313N has been recorded.

The Composite Call Object also includes a Destination Key 315. This key 315 specifies the location where the Composite Call Object is to reside. This location may be specified by a human operator or may be specified automatically. The automatic specification may be, for example, the location where the process was initiated, the location where the last device or program or information was accessed, a business center in the area where the customer is located or the document is to be mailed or stored, or some repository based upon a geographical or business preference. Once the Composite Call Object has been assembled, then the Composite Call Object is transferred to the specified location. The Composite Call Object may be transferred over any available communications link which connects the location where the Composite Call Object currently resides and the destination location. Once the destination location has confirmed the receipt of the Composite Call Object then the present location may delete the Composite Call Object from its memory or send the Composite Call Object to another location to be archived.

In addition, the Composite Call Object includes a Persistence Key 317. The persistence key determines the duration or active lifetime of the Composite Call Object. The persistence key may be a simple time-based or date-based function, such as May 23, 1998, or may be a result-based function, such as "document mailed" or "full payment received", etc.

Once the business process is complete in step 211 then the disposition of the Composite Call Object must be determined. If the business process is complete then there is no further need for the Composite Call Object so it may be automatically deleted at the end of the business process, or may be automatically deleted at a certain amount of time after the end of the business process, or may be manually deleted, such as by a supervisory agent. These trigger events are user definable as Business Processes and individual tasks are developed therefor.

However, in many cases, the business process has not been completed simply because the current call has been completed. For example, the calling party (inbound call) may have wanted some information which was not immediately available, or the party may have been called (outbound call) to discuss a past due account and a payment date. In either case, follow-up action is necessary. The business process mediator element 307 specifies when the follow-up action is necessary. For example, in the case of a payment schedule, the agent involved may create a business process mediator element 307 which activates the Composite Call Object two weeks later. At that time, the agent is automatically connected to the payment record(s) through the data connection broker. The process may be completely automatic because the Composite Call Object contains the addresses of the records and the agent, and the identification of the necessary brokers. If the payment has been made, and no further payments are scheduled, then the business process is complete and the Composite Call Object may be deleted. However, if further payments are scheduled, then the Composite Call Object will be retained and the business process mediator element will schedule the next date for activation. If the payment has not been made, then the agent may, by simply pressing a button, initiate a call to the party because the Composite Call Object contains the information about the party, or the addresses of the records necessary to obtain such information.

Because the Composite Call Object has the complete information necessary to reconstruct a call when an activating event occurs, the Composite Call Object need not be stored in any particular device. Stated another way, the Composite Call Object is portable and may be stored in the memory of and implemented by any device which can execute programs. "Memory" includes, but is not limited to, RAM, ROM, EEPROM, floppy disks, hard disk drives, optical storage media, etc. Therefore, the Composite Call Object may be stored in the memory of and may be executed by an agent station 10, or in a server such as 15C and 20A, or in a host 13, or in a database 11, or even in dialer 12. Of course, it is preferable, but not necessary, to store the Composite Call Object in a device which is an origination point or a destination point, or a point central to these points. For example, if agent stations 10A and 10B were involved in the process that created the Composite Call Object, then the preferred repository for the composite call would be in agent station 10A or 10B, or possibly one of the local hosts 13, or a local server 20. However, as stated above, the composite call may be stored elsewhere such as, for example, a remote host or a destination host (not shown) accessible by a network or modem connection, such as through servers 15C and routers 20A, 20B.

If the composite call were stored in, for example, host 13A, then host 13A would monitor for the activating event. When the activating event occurred then host 13A would collect the resources necessary to perform the composite call and then reconstruct the connections necessary to implement the composite call. Another method of accomplishing the same result would be for the originating host 13A (where the initial event occurred) to monitor for the activating event and, when the activating event occurred, host 13A could transfer the Composite Call Object, along with an indication or a flag that the event had occurred, to another device, such as host 13N or another remote host (not shown), or even to one of the devices involved in the composite call, such as agent station 10A, 10B or an external agent station at a remote location. The device to which the Composite Call Object was transferred would then execute the steps necessary to implement the composite call. Therefore, the Composite Call Object may be stored, and the activating event monitored, by a device which is in another physical location, such as in another state or even in another country, than the devices which are actually connected together to implement the reconstructed composite call. However, it is preferable from an efficiency viewpoint to store the Composite Call Object in a device which is responsible for or which is directly responsive to the triggering event, or in a device which has a desirable geographic location, economic benefit, or feasibility. For example, if the triggering event is an incoming telephone call from a particular number, as indicated by an ANI signal, then the preferred repository for the Composite Call Object would be in a host to which the ANI information was reported. Of course, the ANI information could be reported to all devices, which would be a less than optimal use of network bandwidth and device processing time, or the device in which the composite call was stored could periodically poll the source or recipient of the ANI information, which may cause a delay in detecting the triggering event if the polling rate is too slow, or may cause an efficient use of network bandwidth and device processing time if the polling rate is too high.

Figure 4A:
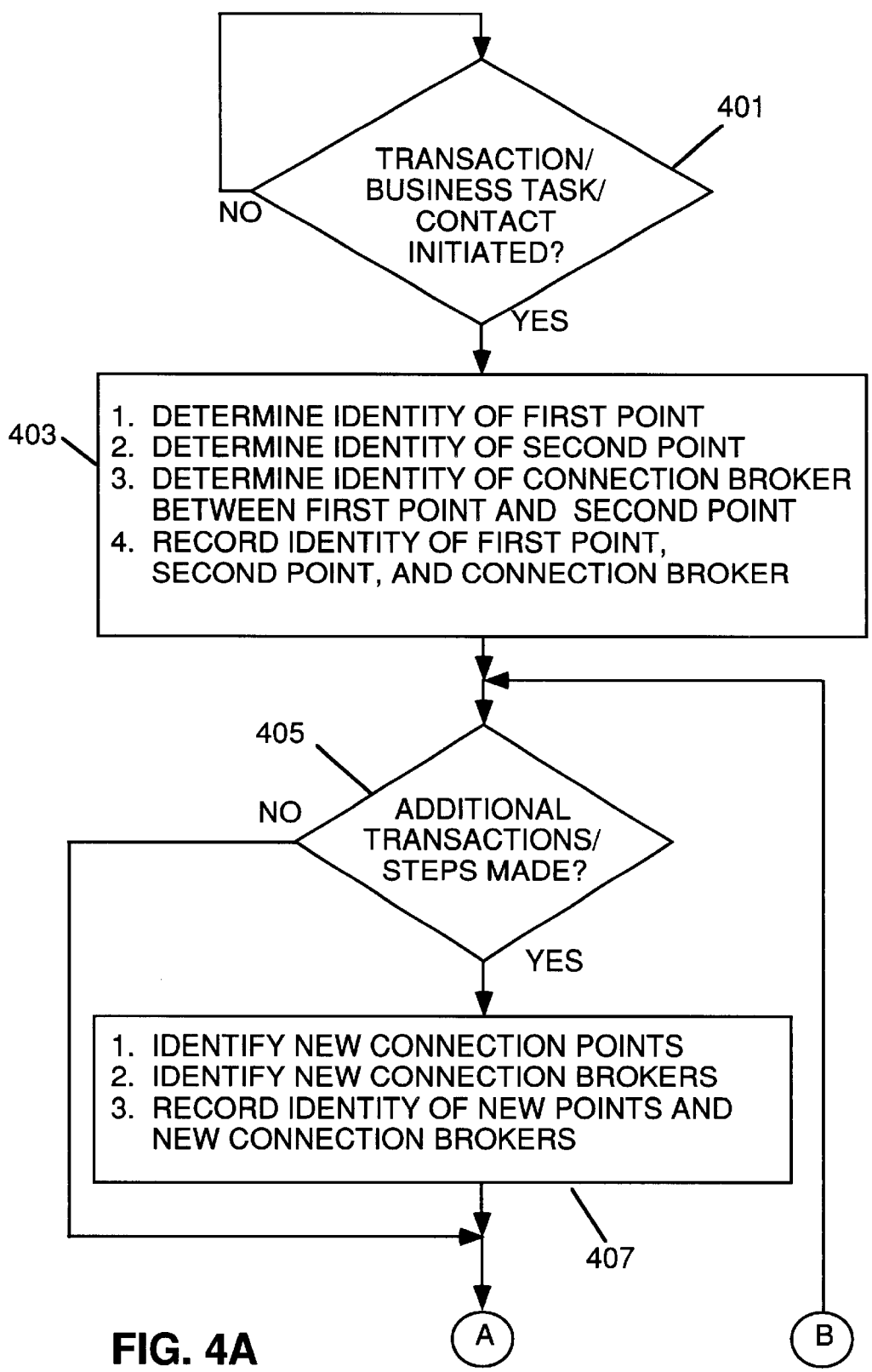
FIGS. 4A and 4B are a flow chart of the process of creating a Composite Call Object.
Figure 4B:
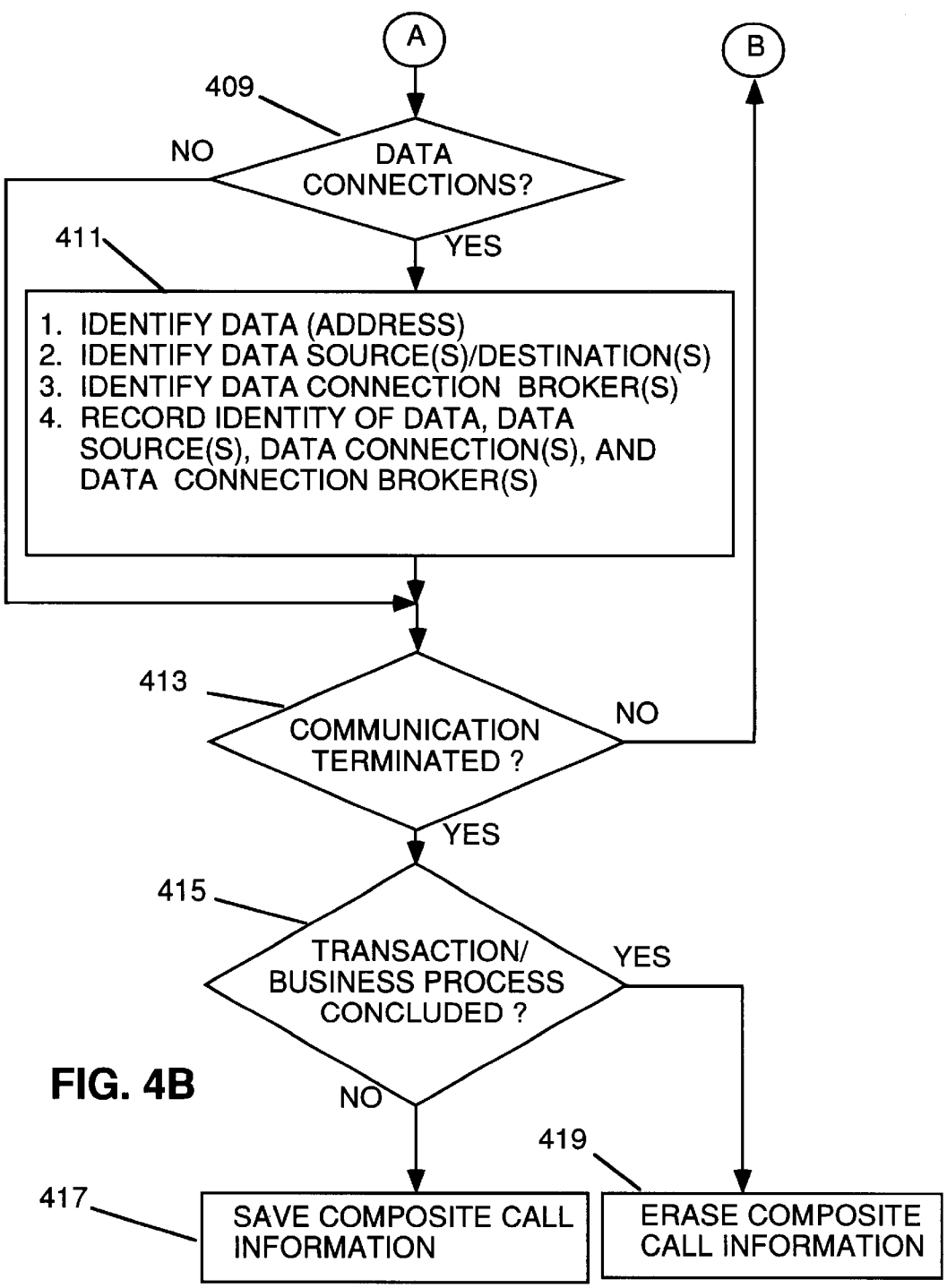

Turn now to FIGS. 4A and 4B which are a flow chart of the process of creating a Composite Call Object. Step 401 determines whether a communication or a business task has been initiated. As stated above, a business task may be an inbound or outbound call, letter, document, internet inquiry, etc. If a business task has been initiated then, in step 403, the identity of the first point and the second point are determined. Typically, the first point will be an originator and the second point will be an initial destination. The originator of the transaction may be the customer, for example, in the case of an inbound call, and the designation may be an agent. However, the originator of the transaction may also be an agent, for example, in the case of an outbound call, and the destination may be a customer. It should be appreciated that the term "agent" includes "electronic agents", such as programs which run in the background on an agent workstation, an interactive voice response system, etc. Step 403 also identifies the connection broker which connects the first point to the second point, for example, the PBX which connects the customer to the agent. Then, in step 403, these identities are recorded in the Composite Call Object.

Other agents may be called in, or other resources may be used, so step 405 determines whether any additional connections (to devices, programs, databases, information sources, etc.) have been made during the communication. If so then step 407 is executed. If not then step 409 is executed.

In step 407 any new connection points are identified, any new connection brokers are identified, and these identities are recorded in the Composite Call Object. The new points are destinations because they did not originate the communication but were added to the communication or the communication was transferred to them. Then step 409 is executed.

Step 409 determines whether any data connections have been made. Data connections may be made, for example, between a host and an agent workstation, between an agent workstation and a printer or a modem or a facsimile modem, between an "electronic agent" and a host, printer, modem, etc. If not then step 413 is executed. If so then step 411 is executed.

Step 411 identifies the address of the data, identifies the data source(s) or destination(s), and identifies any data connections broker(s) used in accessing and/or transferring data from a data source to a data destination. As stated above, the address of a device may be, for example, a network address, and the address of data may be, for example, a pointer to where the data is located in the specified device, which may be located at any location in the world where it can be accessed via any communications link. Step 411 also records these identities and addresses. Step 413 is then executed.

Step 413 determines whether the communication has been terminated. If not then the process returns to step 405. If so then step 415 determines whether the transaction or business process has been concluded.

If the transaction has not been concluded, as indicated by an agent keystroke or code entry, then in step 417 the composite call information recorded above is saved, along with the specified event trigger or triggers. If the transaction has been concluded, based upon user-predefined business processes and/or as indicated by an agent keystroke or code entry, then in step 419 the composite call information recorded above is erased or, if desired, stored in an archive.

Figure 5:
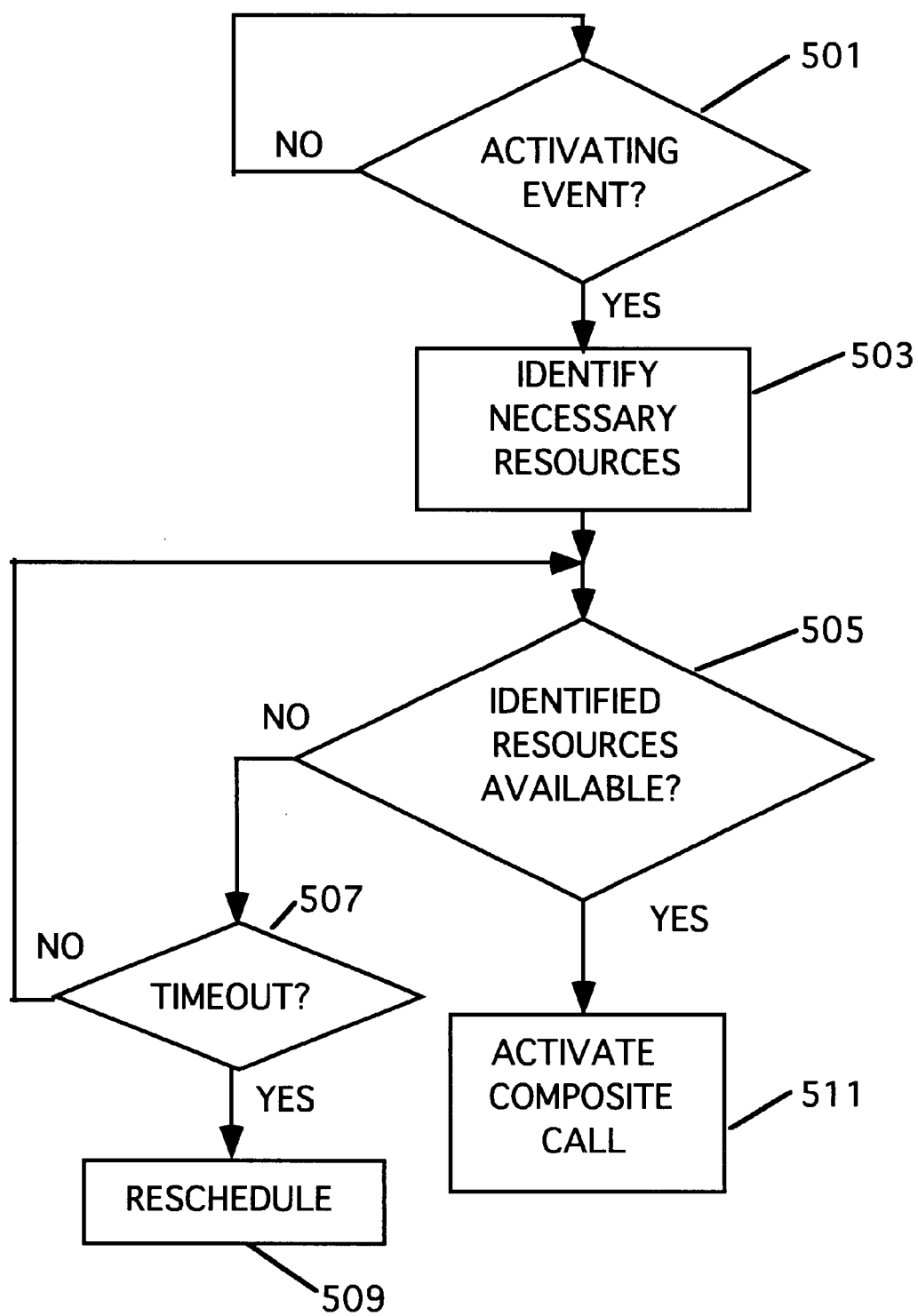
FIG. 5 is an illustration of the business process mediator of a Composite Call Object.

Turn now to FIG. 5 which is an illustration of the business process mediator 307. The business process mediator determines whether the resources necessary to implement a particular action are available at a particular time. The business process mediator and the information needed thereby may be included as part of the Composite Call Object, or the information necessary to support the business process mediator may be included as part of the Composite Call Object where the destination location already has the business process mediator software. As shown in step 501, the business process mediator first determines whether there has been an activating event. The activating event may be a predetermined temporal event, such as a particular month, day, date, or time, or may be a non-temporal triggering event or an external triggering event, such as an incoming telephone call, or the receipt of a payment, or the receipt of a letter, facsimile document, or an e-mail message, or an agent pressing a key to cause a settlement check, letter, facsimile document, or e-mail to be sent, etc. The activating event is part of the information in the Composite Call Object. Although a Composite Call Object may reside at any location, in the preferred embodiment the activating event is only monitored by the location specified in the destination key. This prevents multiple devices from attempting to perform the same function (executing the Composite Call Object) simultaneously. However, it is possible to add another key, such as an monitor key (not shown), to the Composite Call Object which specifies that a location other than the destination location is to monitor for the activating event. In this scenario the monitoring location will notify the destination location, or transfer the Composite Call Object to the destination location, when the activating event occurs.

When an activating event occurs then, in step 503, the necessary resources to accomplish the designated task are identified. For example, if the designated task was to send a follow-up facsimile letter or a follow-up e-mail letter then, step 503 would identify a facsimile device as a necessary resource, or identify an e-mail server (or a modem to connect to the internet, etc.) as a necessary resource.

In step 505, the business process mediator determines whether the identified resources are available. This may be done, for example, by sending a command to an identified resource and awaiting an affirmative response or a busy signal from the resource, or sending a request for the identified resource to a server which controls such a type of resource and awaiting a response from the server.

If the identified resources are available then, in step 511, the composite call is activated, as described below.

If the identified resources are not available then, in step 507, a determination is made whether the identified resources have not been available for a specified time, i.e., a "time-out" condition. If the time-out condition has not occurred then step 505 is repeated. If the time-out condition has occurred then, in step 509, the composite call is rescheduled for a later time or other subsequent activating event. The rescheduling may be automatic or manual. For example, if the identified resource was a modem and a modem was not available then the composite call may be rescheduled for 10 minutes later. For another example, if the identified resource was a modem, the modem was not available, and the action to be taken had been previously designated by an agent as "urgent" then the Composite Call Object may be forwarded to a supervisory agent to determine whether and when to reschedule the call, or what alternative action should be taken. Also, any other resources capable of performing the specified task will typically be utilized.

Figure 6:
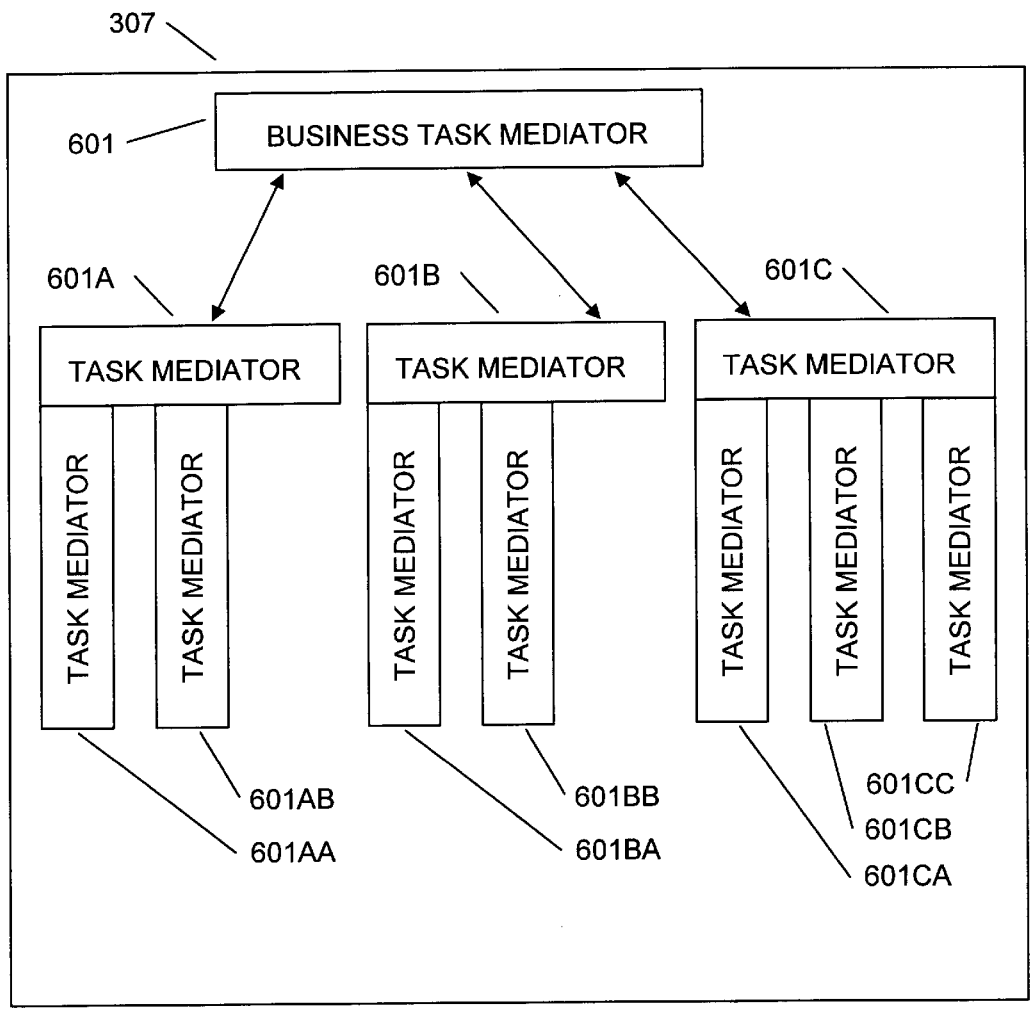
FIG. 6 is an illustration of the preferred structure of the business process mediator.

FIG. 6 illustrates the preferred structure of the business process mediator. The business process mediator 307 includes a business task mediator 601, which may include a plurality of lesser task mediators, and each lesser task mediator may include a plurality of even lesser task mediators. The business task mediator 601 implements the business task mediator 307. The term "lesser" simply means that a "lesser" process is called by or is subservient to another process that called it. In the example shown, the business task mediator 601 includes three task mediators 601A, 601B, and 601C. Each of these task mediators includes more task mediators. For example, task mediator 601A includes task mediators 601AA and 601AB. The number of business task mediator 601 shown as subservient to the business process mediator 307 is purely for convenience and is not a defining or limiting feature of the present invention. Likewise, the number of task mediators shown as subservient to another task mediator is purely for convenience and is not a defining or limiting feature of the present invention. Also, the number of levels of mediators (307, 601, 601A, 601AA) is purely for convenience and is not a defining or limiting feature of the present invention.

An example of a business process mediator 307 is to connect an agent at workstation 10A to customer 16. As previously stated, "agent" includes "electronic agents", such as programs which run on agent workstations. These programs may initiate tasks without the involvement of a human agent. The business task mediator 601 implements the processes necessary to achieve this result. The function of task mediator 601A is to reserve a particular agent for the contact with the customer 16. The particular agent would preferably be the agent who had previously communicated with the customer. The function of task mediator 601AA is to determine if the agent had logged on and, if so, at what workstation 10A the particular agent is logged on. This is accomplished by querying the supervisory host 13 or server 20 to which the agent reports. If the supervisory device reports that the agent is not logged on then task mediator 601AA reports to task mediator 601A that the specified agent is not available. The task mediator 601A then reports to the business task mediator 601 that the agent is not available. Then, depending upon the conditions specified by the user, the business task mediator 601 will keep trying to reserve the agent until the agent is available, try to reserve the agent at a later time, try to reserve the agent again on a different date, try to reserve a different agent, etc. In another embodiment, the task mediator 601A will automatically keep trying to reserve the agent until the agent is available, try to reserve the agent at a later time, try to reserve the agent again on a different date, etc. An agent may be identified by any convenient means, such as an agent identification number or an employee number, or a device or program number for an electronic agent.

If the agent at workstation 10A has logged on, the supervisory device will report this and also report which workstation 10A at which the agent is logged on. The task mediator 601A then activates the task mediator 601AB, whose function is to reserve the agent at workstation 10A. This is accomplished by, for example, sending a request for the allocation of a resource, the particular agent or the workstation 10A, to the supervisory device for workstation 10A. If the supervisory device returns a message that the agent or workstation 10A is busy then task mediator 601AB reports this to task mediator 601A. Task mediator 601A then reports this to the business task mediator 601, which responds according to the conditions specified by the user. Alternatively, the task mediator 601A may automatically respond to the busy condition of workstation 10A.

If the supervisory device honors the request for the allocation of the agent or workstation 10A then task mediator 601AB reports to task mediator 601A that the agent or workstation 10A has been reserved. The task mediator 601A reports to business task mediator 601 that the agent and/or workstation 10A has been reserved.

The business task mediator 601 then calls the task mediator 601B. In this example, the function of the task mediator 601B is to call the customer 16. The task mediator 601B will then call task mediator 601BA. Task mediator 601BA will send a request for allocation of a resource, a trunk line, to the PBX 17. The PBX will return a message either granting or denying the resource. If the resource is denied then task mediator 601BA will report this to task mediator 601B, which will take some appropriate action or report this condition to the business task mediator 601, which will take the appropriate action.

If the resource is granted then task mediator 601BA will report this to task mediator 601B. Task mediator 601B will then call task mediator 601BB, which will cause the PBX 17 to dial the telephone number of the customer 16 on the allocated trunk line. Task mediator 601BB will then call one or more task mediators (not shown) which monitor and report the progress of the call (no dial tone, ringing, busy, no answer, call intercepted, answered by a human, answered by an answering machine, answered by an internet home page, answered by a modem or a facsimile device, answered by an electronic mail server, etc.). If the customer 16 does not answer (no dial tone, busy, no answer, call intercepted, answered by an answering machine, etc.), then the task mediator 601BB will report this to the task mediator 601B, which may take some appropriate action or report this condition to the business task mediator 601, which will take the appropriate action.

If the customer 16 answers then the task mediator 601BB will report this to the task mediator 601B, which will report the connection to the business task mediator 601. The business task mediator 601 will then call another task mediator 601C, which has the function of connecting the customer 16 with the agent at the workstation 10A.

Task mediator 601C will call task mediator 601CA which has the function of connecting the agent workstation 10A to the customer 16 via the allocated trunk line and the PBX 17, and call task mediator 601CB which has the function of sending the information in the Composite Call Object concerning the customer to the workstation 10A, and call task mediator 601CC which has the function of causing the agent workstation 10A to be connected to the hosts 13, databases 11, servers 15C and 20A, etc., through the routers 20B.

Thus, upon the occurrence of the activating event, the Composite Call Object automatically causes the necessary resources to be allocated and the necessary connections to be made to reconstruct the call between the identified parties or resources and to provide the necessary information to the agent to assist the customer.

In the preferred embodiment the agent, at some point in a transaction will input a code or keystroke indicating that the further action is necessary. It is not necessary for an agent or a supervisor to identify the task mediators necessary to accomplish a composite call or even to indicate that a composite call is desired. Rather, in the preferred embodiment, the agent simply needs to indicate that further action is necessary, the approximate time or a time frame, the type of action (call, letter, send letter or document by facsimile, send letter or document by e-mail or internet, check status of payment, check status of order, etc.), the urgency of the action, and the condition (activating event) which will initiate the action. These items provide the information necessary for the business process mediator 307 and business task mediator 601 to perform their functions. The type of action specifies the resources needed to accomplish the action. For example, specifying that a further telephone call is needed automatically specifies that an agent workstation (or a prerecorded message indicating the purpose of the call via an interactive voice response unit), a telephone trunk line, and a connection via the PBX 17 or directly via the public telephone network are necessary for the audio portion, and that the same agent workstation, certain hosts 13, databases 11, etc., and servers/routers 15/20 are necessary for the agent to have the necessary information. Thus, specifying that a further telephone call is needed, automatically invokes a business task mediator 601 which is designed to execute telephone calls. The calling of this particular type of business task mediator then automatically invokes lesser task mediators 601A, 601B, and 601C, which are each designed to accomplish a particular function. Each of these lesser task mediators automatically invoke the further task mediators necessary to accomplish the particular steps necessary to achieve the particular function.

For another example, specifying that a follow-up letter via a post office is needed, automatically specifies that a printer is needed (not shown) and automatically invokes a business task mediator 601 which is designed to accomplish printing and, if desired, the mailing of the letter. This particular business task mediator may directly accomplish the specified action or may automatically invoke related lesser task mediators necessary to accomplish the printing and/or mailing tasks. For another example, specifying that a follow-up facsimile or e-mail letter is needed, automatically specifies that a modem or a facsimile device is needed (not shown) and automatically invokes a business task mediator 601 which is designed to accomplish sending of documents by facsimile or e-mail. Again, a business task mediator may directly accomplish the specified action or may automatically invoke related lesser task mediators necessary to accomplish this action. For another example, specifying that the status of payment should be checked automatically specifies that an agent workstation, the current customer account status information in the appropriate host 13, and a connection between the two via a server/router 15/20 are necessary, and the business task mediator necessary to accomplish this would automatically be called, and this business task mediator will automatically call the necessary lesser task mediators, to ensure that the payment verification task is deployed.

As another example of the present invention, assume that ABC Corporation sells and services several product lines of video cameras, video cassette recorders, television sets, compact disc players, and other consumer electronics on a worldwide basis. Assume that ABC Corporation has sales offices and warehouses in various cities such as New York, Los Angeles, Denver and Atlanta, in the USA, and has a centralized service and repair center in Dallas. The Dallas center serves as a hub for a private intra-company communication network, and also serves as the point to which all consumer calls and all authorized repair calls are directed through the public switched telephone network.

ABC Corporation's objectives for servicing customers include: providing customers with easy access and fast response through toll-free numbers for sales and service; guaranteeing that all calls are handled by qualified representatives who have all of the information needed to provide the best quality of service; ensuring service issues not resolved on the first call will be followed up in a timely manner or passed to other representatives who can provide immediate attention; providing management with instant feedback to measure the level of service being provided; monitoring operations to ensure that the conditions for customer satisfaction are always met; proactively calling customers to confirm that they have received quality services and to promote new services and products; and establishing ABC Corporation as the leader in customer service.

In this example, the scenario is that of an incoming service call. The process begins when an incoming customer call is detected by the telephone system of the service center at the business or call center. In this scenario, a consumer has dialed a toll free number, such as an 800 in the USA, which has been published by the service center for help on a specific product line. All 800 numbers are routed by the telephone company to the same group of trunks which terminate in the telephone system of the service center. Calls intended for help with this particular product line are distinguished by the DNIS digits (which identify the particular 800 number called by the consumer) passed to the telephone system of the service center by the telephone company central office. A Work Controller application, such as automatic call routing by an automatic call distributor (ACD), will initiate the first task in the process by using the DNIS information to route the incoming call concerning a service request for this product to an available agent, operator, or service representative.

Composite Call Objects exist outside of specific applications. Therefore, Composite Call Objects are application independent and are accessible by any host or workstation connected to the network through a common protocol. The Composite Call Object, the container, and even the control over it, are transferable globally, and the Composite Call Object carries with it the relevant information and the history needed to document and complete complex, long term processes or functions. For example, a network server may create a Composite Call Object and assume initial ownership, control and management of the Composite Call Object. Then, information that could be relevant to a process, such as handling an incoming servicing request, becomes a candidate for capture by the Composite Call Object. Examples of such information are: the incoming trunk number or trunk group number; the time of day, day of week, and/or month; the dialed number, which is available as dialed number information service (DNIS) digits; the calling number, which is available as automatic number identification (ANI) digits; an interactive voice response (IVR) input from the calling party; a customer account record; customer service records, such as the service history; the identity of the representative that is handling the customer or has handled the customer; on-line product reference libraries; trouble-shooting procedures; a scheduled call-back time; a repair order record; a parts return authorization; a parts purchase order; warranty information; a product brochure; and inventory status.

The first component added to the Composite Call Object is the identity of the host computer and the controlling server. The first work control agent (WCA) will provide call treatment until such time as it transfers control to a different WCA or transfer control back to the Work Controller. The first WCA creates the Composite Call Object and deposits the first elements of information in the Composite Call Object container. Thus, the Composite Call Object now contains the location of the host computer/server and the unique ID of this business process. The first WCA in the business process has the responsibility for adding account-related elements to the call object and routing both voice and data components to the proper service representative.

Information elements may be of several different types. For example, information elements may be "public" elements which are visible to or accessible by external applications; "private" elements which are used to track states and the history of the Composite Call, are stored at the controlling host, but are not "public" elements; and "reference" elements, which indicate where on the network that data is stored. For example, date and time of the incoming call are "public" elements, and the Host, workflow ID, and state are "private elements".

In this example, the telephone company has also provided ANI information. The WCA uses the ANI information as a key into the customer database to retrieve basic information about the customer which can be used by the service representative to personalize the first minutes of the conversation. The WCA determines at this time whether there are outstanding processes (workflows) of this same type for the calling party. State of "open" workflows can be changed by the representative depending upon the customer's request for service. The header of the customer account information also provides the representative's PC desktop application with an abbreviated set of customer record fields which are needed to retrieve additional customer information from other data sources within the enterprise. The customer account header is stored as a "private" element.

The WCA coordinates routing the voice call and the Composite Call Object to an available service representative who is part of a group certified with respect to that product line. It should be remembered that the group is selected based upon the DNIS digits received. If the retrieved customer account header indicates a language preference, that language preference information can be used to route the incoming call to an agent within the group who has the desired attribute (speaks the indicated language).

The application active on the desktop PC of the selected representative uses the customer account header information to display basic information about the calling party. The service representative uses this information to greet the calling party and to verify that the calling party is, indeed, the customer. At the same time, the application is retrieving information about the account from other sources on the network in order to furnish the representative with other information such as model number, service history, and warranty information.

The service representative confirms the customer's address and telephone number and, in this example, records a recent address change indicated by the customer. A record of the changes made are stored in a transaction database, and a pointer to the transaction is added to the Composite Call Object. In addition to the pointer, a short description of the transaction and a time stamp are part of this new component. Thus, the Composite Call Object, in addition to the elements mentioned above, now has a first transaction segment or first call segment. The first segment has new public elements: the service representative ID number and the device address of the PC used by the service representative; and the time in queue, such as an incoming call holding queue. Further, this first segment, now also has a new reference element: the address change transaction.

The representative adds a series of trouble-shooting questions to the display by clicking on (selecting) the model number of the product, as currently displayed. It will be recalled that the model number was obtained based upon the customer account header. From the trouble-shooting questions and the answers of the customer the representative determines that the product is defective. Note that the information retrieved earlier includes the warranty information, such as the purchase date, and from this information the representative is able to determine that the warranty on the product is still valid. The representative then selects a return authorization form from a menu in the desktop PC application and then instructions for returning the defective product are displayed. After informing the customer of the proper procedure and issuing the return authorization number, the representative enters an order to replace the defective merchandise. The desktop PC application then adds the following additional reference elements to the first segment: the Return Authorization transaction; the Sales Order transaction for the replacement product.

The sales order transaction initiates a secondary workflow that involves reserving the item in inventory, adding it to the carrier bill of lading for a scheduled afternoon shipment to a distribution point, and printing the order in the shipping department at the warehouse some distance away. The secondary workflow is automatically accomplished by a workflow script initiated by the Sales Order transaction. The secondary workflow does not require human action or intervention, and is accomplished without the direct knowledge of, or any action by, the representative. Note that all data associated directly with the Sales Order transaction can be found through the pointer (reference element) contained in the Composite Call Object for the Sales Order transaction.

This transaction ended the representative's interaction with the customer for this call. However, the workflow and the Composite Call Object will persist until the conditions of this business process are complete. When the call was terminated, the desktop application caused a state change in the WCA which originally delivered the Composite Call Object. This event causes the workflow to progress to the next step.

In addition to starting the sales order workflow, the WCA also registered a callback for one week from the date of the sales order (the one week being the time allowed for shipping). The scheduled callback will be a follow-up to the first incoming call and will be to confirm that the customer has received the replacement product and that the customer is now satisfied. The WCA registers the callback with a scheduling application and also adds a reference element to the first segment: the scheduled callback.

The workflow now enters a dormant state awaiting the callback action. At the scheduled time, the scheduling application invokes the callback by changing the state of the active WCA in the workflow. Control of the workflow is passed to a subsequent WCA that queues an outbound call to the customer. The outbound call is assigned a priority that assures that the outbound call will be delivered to the service representative before any inbound calls that might be in queue for that service representative. The service representative will be the same representative that previously handled that customer. It will be recalled that the service representative ID and device address were stored as part of the Composite Call Object. If that same service representative is not available (on vacation, out sick, no longer employed) then another service representative will be selected. This creates a second call segment, and this second call segment contains the private information of the service representative ID and device address. The process thus continues until the customer has been satisfied.

The particular resources available to and connections necessary for a particular action will vary from system to system and from enterprise to enterprise. However, in light of the above description of the functions of the business process mediator and various task managers, it will be apparent to one skilled in the art what connections are necessary to implement a particular action.

The particular resources necessary to accomplish a particular result may not be available at a particular site, so a particular task mediator may have the function of accessing remote sites, and may invoke any lesser task mediators necessary to obtain the desired remote resource.

From a reading of the description above of the preferred embodiment of the present invention, modifications and variations thereto may occur to those skilled in the art. Therefore, the scope of the present invention is to be limited only by the claims below.

We claim:

1. A method for establishing a second communication between a first point and an information source after a first communication has been established between said first point and a second point, comprising the steps of:

identifying an information source providing data accessed by said first point during said first communication, said information source being one of a plurality of information sources;

identifying a data connection broker between said first point and said information source used for transferring data accessed during said first communication, said data connection broker being one of a plurality of data connection brokers;

creating a Composite Call Object for said first communication by recording information concerning said first communication, said information comprising an identiey for said second point, an identity for said information source and an identity for said data connection broker; and after said first communication between said first point and said second point has been terminated:

terminating said communication between said first point and said information source;

establishing said second communication between said first point and said second point; and connecting said first point to said information source through said data connection broker using information contained in said Composite Call Object to identify said second point, said information source, and said data connection broker.

2. The method of claim 1 wherein:

said step of creating said Composite Call Object comprises identifying data accessed by said first point and further recording, as said information, an address for said data; and said step of connecting said first point to said information source comprises retrieving said data from said information source and presenting said data to said first point.

3. The method of claim 1 and further comprising:

identifying a connection broker between said first point and said second point;

said step of creating said Composite Call Object further comprises recording, as said information, an identity for said connection broker between said first point and said second point; and said step of establishing said second communication comprises reading said information to identify said first point, reading said information to identify said second point, reading said information to identify said connection broker between said first point and said second point, and causing said connection broker to establish a communications path between said first point and said second point.

4. A method for using a first communication among a first point, a second point, and a third point to establish a second communication between said second point and said third point, comprising the steps of:

creating a Composite Call Object for said first communication by recording information concerning said first communication, said information comprising an identity for said second point;

monitoring for a command from said first point to establish a new connection between said third point and at least one of said first point and said second point;

identifying a new communications route used to establish said new connection between said third point and said at least one of said first point and said second point, said new communications route being one of a plurality of communications routes and updating said Composite Call Object to record said new connection and said new communications route;

after said first connection and said new connection have been terminated:

establishing said second communication between said second point and said third point by using information about said new connection contained in said Composite Call Object to identify said second point, said new communications route, and establishing said second communication using said new communications route.

5. The method of claim 4 wherein:

said step of creating said Composite Call Object comprises identifying data accessed by said first point during said first communication and recording, as said information, an address for said data; and said step of establishing said second communication comprises using said information contained in said Composite Call Object to retrieve said data accessed by said first point, and presenting said data to said third point.

6. The method of claim 4 wherein:

said step of creating said Composite Call Object comprises identifying an information source providing data accessed by said first point during said first communication, said information source being one of a plurality of information sources, and recording, as said information, an identity for said information source; and said step of establishing said second communication further comprises connecting said third point to said information source.

7. The method of claim 4 wherein:

said step of creating said Composite Call Object comprises identifying data accessed by said first point, identifying an information source providing said data, said information source being one of a plurality of information sources, identifying a data connection broker between said first point and said information source, said data connection broker being one of a plurality of data connection brokers, recording, as said information, an address for said data, an identity for said information source, and an identity for said data connection broker; and said step of establishing said second communication comprises connecting said third point to said information source through said data connection broker and retrieving said data from said information source and presenting said data to said third point.

8. A method for using a first communication among a first point, a second point, and a third point to establish a second communication between said second point and said third point, comprising the steps of:

identifying an information source providing data accessed by said first point, said information source being one of a plurality of information sources;

identifying a data connection broker between said first point and said information source, said data connection broker being one of a plurality of data connection brokers, creating a Composite Call Object for said first communication by recording information concerning said first communication, said information comprising an identity for said second point, an identity for said information source, and an identity for said data connection broker;

monitoring for a command from said first point to establish a new connection between said third point and at least one of said first point and said second point;

identifying a new communications route and a communications broker used to establish said new connection between said third point and said at least one of said first point and said second point, said new communications route being one of a plurality of communications routes and updating said Composite Call Object to record said new connection, said new communications route, and said identity of said data communications broker for said new communications route; and after said first connection and said new connection have been terminated:

establishing said second communication between said second point and said third point by using information about said new connection contained in said Composite Call Object to identify said second point, said new communications route, and said communications broker, and using said new communications route to connect said third point to said information source through said connection broker identified for said new communications route.

9. The method of claim 8 wherein said step of establishing said second communication comprises:

reading said information from said Composite Call Object to identify said second point;

reading said information from said Composite Call Object to identify said third point;

reading said information from said Composite Call Object to identify said connection broker; and causing said connection broker for said new communications route to establish a communications path between said second point and said third point.

10. The method of claim 9 wherein said step of establishing said second communication further comprises:

reading said information from said Composite Call Object to identify said information source which provided said data accessed by said first point;

reading said information from said Composite Call Object to identify said data connection broker which provided said connection between said first point and said information source; and causing said data connection broker to establish a data communications path between said third point and said information source.

11. A method for using a first communication among a first point, a second point, and a third point to establish a second communication between said second point and said third point, comprising the steps of:

determining an identity for said third point;

determining an identity for a connection broker between said first point and said second point, said connection broker being one of a plurality of connection brokers; and creating a Composite Call Object for said first communication by recording information concerning said first communication, said information comprising said identity for said first point, an identity for said second point, and said identity for said connection broker;

monitoring for a command from said first point to establish a new connection between said third point and at least one of said first point and said second point;

identifying a new communications route used to establish said new connection between said third point and said at least one of said first point and said second point, said new communications route being one of a plurality of communications routes;

updating said Composite Call Object to record said new connection and said new communications route;

after said first connection and said new connection have been terminated:
establishing said second communication between said second point and said third point by using information about said new connection contained in said Composite Call Object to identify said second point and said new communications route, and establishing said second communication using said new communications route.

12. The method of claim 11 wherein said step of creating said Composite Call Object further comprises:

identifying data accessed by said third point; and recording, as said information, an address for said data.

13. The method of claim 11 wherein said step of creating said Composite Call Object further comprises:

identifying an information source providing data accessed by said third point, said information source being one of a plurality of information sources; and recording, as said information, an identity for said information source.

14. The method of claim 11 wherein said step of creating said Composite Call Object further comprises:

identifying an information source providing data accessed by said third point, said information source being one of a plurality of information sources;

identifying a data connection broker between said third point and said information source, said data connection broker being one of a plurality of data connection brokers;

recording, as said information, an identity for said information source; and recording, as said information, an identity for said data connection broker.

15. The method of claim 11 wherein said step of creating said Composite Call Object further comprises:

identifying data accessed by said third point;

identifying an information source providing said data, said information source being one of a plurality of information sources;

identifying a data connection broker between said third point and said information source, said data connection broker being one of a plurality of data connection brokers;

recording, as said information, an address for said data;

recording, as said information, an identity for said information source; and recording, as said information, an identity for said data connection broker.

16. A system for establishing a plurality of communications, comprising in combination:

a first plurality of agent stations for allowing a plurality of agents to conduct oral communications with a plurality of persons, and to see information and to input information, each said agent station having an address;

a plurality of hosts, each host of said plurality of hosts containing a plurality of account records, each said host having an address, and each said account record having an address;

a plurality of communications brokers, each of said communications brokers being for establishing communications links among said agent stations and said hosts, each of said communications brokers having an address; and at least one of said agent stations comprising a memory for storing a plurality of Composite Call Objects, each Composite Call Object comprising an address of a first said agent station connected to a first said host via a first said communications broker, an address for said first host, an address for a said account record in said first host, and an address for said first communications broker which links said agent station to said host.

17. A system for establishing a plurality of communications, comprising in combination:

a first plurality of agent stations for allowing a plurality of agents to conduct oral communications with a plurality of persons, and to see information and to input information, each said agent station having an address;

a plurality of hosts, each host of said plurality of hosts containing a plurality of account records, each said host having an address, and each said account record having an address;

a plurality of communications brokers, each of said communications brokers being for establishing communications links among said agent stations and said hosts, each of said communications brokers having an address; and at least one of said hosts comprising a memory for storing a plurality of Composite Call Objects, each Composite Call Object comprising an address of a first said agent station connected to a first said host via a first said communications broker, an address for said first host, an address for a said account record in said first host, and an address for said first communications broker which links said agent station to said host.

* * * * *